United States Patent [19]

Costamagna et al.

[11] 4,351,850

[45] Sep. 28, 1982

[54] PROCESS OF PRODUCING A BATTER-COATED ONION PRODUCT

[75] Inventors: Robert M. Costamagna; Denis W. Mori; Allen R. Bardett, all of Gilroy, Calif.

[73] Assignee: McCormick & Company, Incorporated, Hunt Valley, Md.

[21] Appl. No.: 83,314

[22] Filed: Oct. 10, 1979

[51] Int. Cl.³ .............................................. A23L 1/214
[52] U.S. Cl. ................................ 426/302; 426/102; 426/615; 426/481
[58] Field of Search .............. 426/615, 102, 302, 442, 426/518, 481, 293, 296; 83/404.1

[56] References Cited

U.S. PATENT DOCUMENTS

| | | | |
|---|---|---|---|
| 1,218,577 | 3/1917 | Nutter | 83/404.1 |
| 2,771,370 | 11/1956 | Allen | 426/439 |
| 3,078,172 | 2/1963 | Libby | 426/293 |
| 3,169,069 | 2/1965 | Hanson et al. | 426/291 |
| 3,208,851 | 9/1965 | Antinori et al. | 426/293 |
| 3,597,239 | 8/1971 | Vahlsing | 426/518 |
| 3,764,717 | 10/1973 | Rood | 426/481 |
| 3,976,798 | 8/1976 | Young et al. | 426/291 |

*Primary Examiner*—Raymond N. Jones
*Assistant Examiner*—Elizabeth J. Curtin
*Attorney, Agent, or Firm*—Cushman, Darby & Cushman

[57] ABSTRACT

A frozen onion food product is prepared by a process which includes the steps of peeling and slicing fresh uncooked onions, cutting the resulting onion slabs into pieces most of which are composed of two or more lengths of onion scales in side-by-side relationship, separating each piece into its individual scales or nuggets, coating the separated nuggets with a batter mixture and quick-freezing. The separating operation includes the use of hydro, mechanical and vibratory forces to produce a continuous supply of separated nuggets ready for the coating operation. If desired the coated cubes can be partially fried before freezing.

3 Claims, 6 Drawing Figures

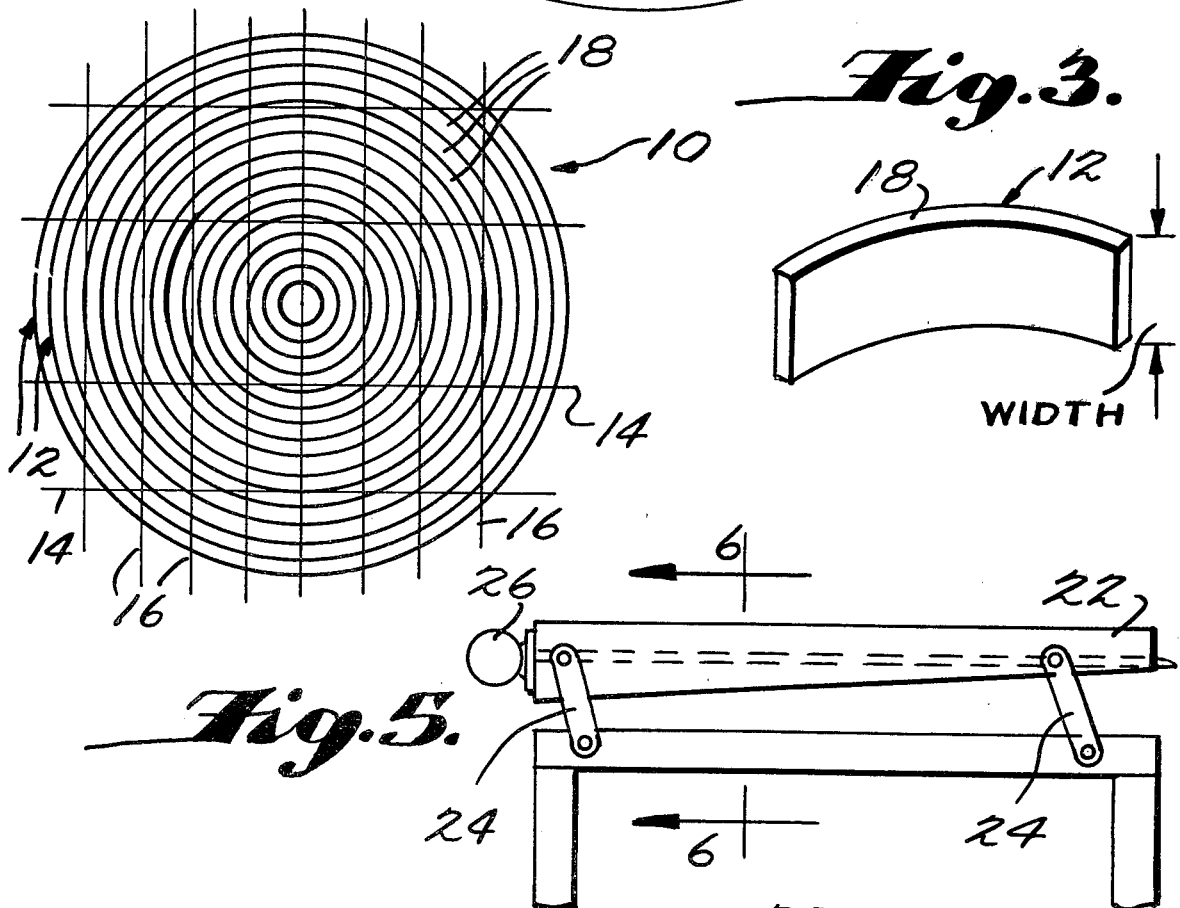

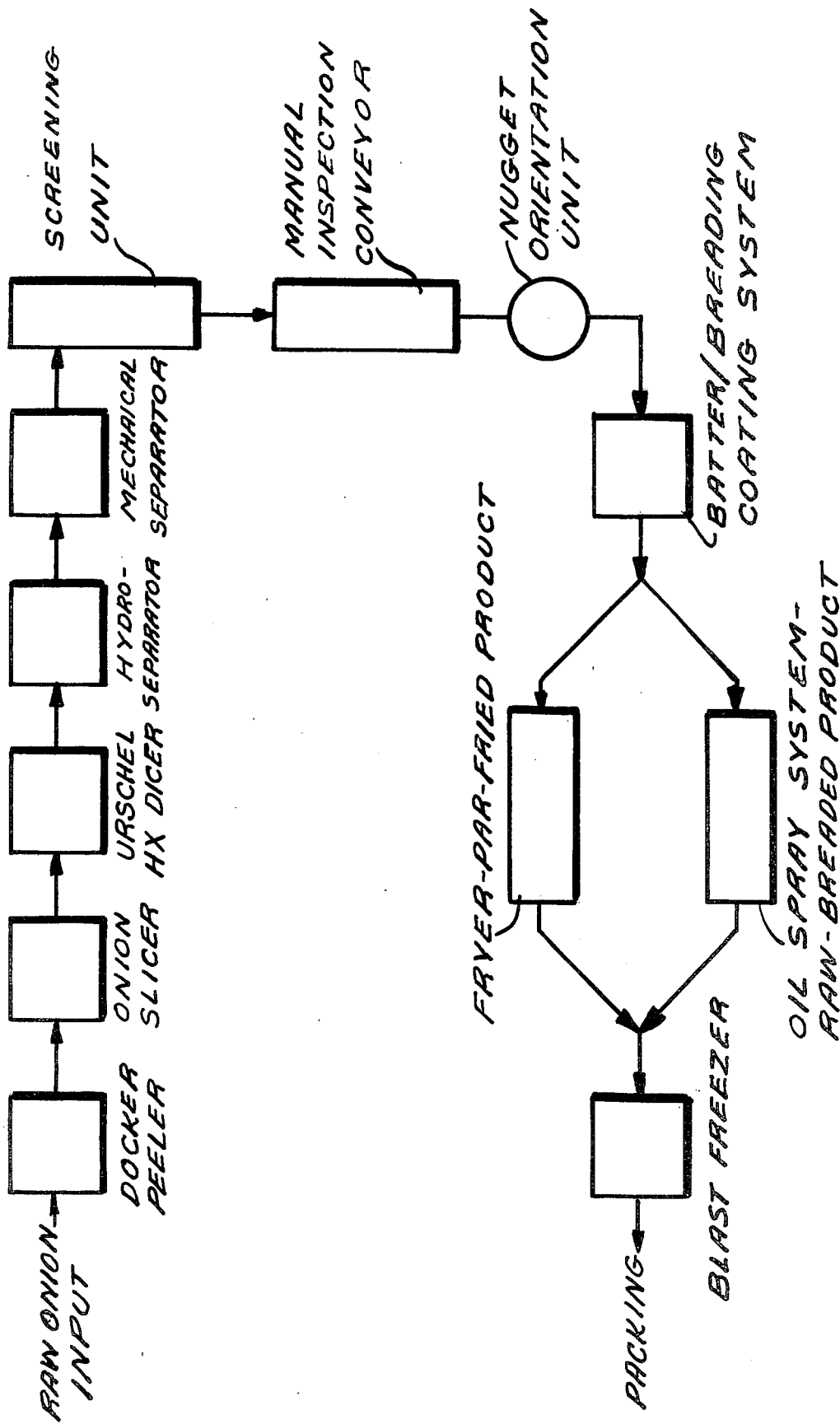

PROCESS OF PRODUCING A BATTER-COATED ONION PRODUCT

This invention relates to an onion food product and to a process for producing the product. In particular, the invention relates to a process for producing discrete, batter-coated onion pieces or nuggets of finite length, rather than batter-coated onion rings as is conventional.

BACKGROUND

Processing of raw onions into the form of packaged, frozen batter-coated onion rings has been carried out commercially for a number of years. In general, such processes include the steps of peeling and slicing the onions, separating the slices into rings, coating the rings with batter, setting the batter as by partial frying (parfrying or flash frying), and freezing either before or after packaging. The step of coating of the rings with batter generally includes applying a liquid batter mixture followed by application of a dry breading mixture and the sequence may be repeated several times. The term natural onion rings is generally used to distinguish these products from processed onion rings made from an extruded onion mix.

Examples of known natural onion-ring processing techniques are described in U.S. Pat. Nos. 3,976,798, 3,208,851, 3,169,069, 3,078,172 and 2,771,370.

The applicants are not aware of any prior technique for producing discrete coated natural onion pieces of finite length.

SUMMARY OF THE INVENTION

The present invention provides a new batter-coated onion product and a method for producing the product.

The product is in the form of discrete batter-coated, nonagglomerated onion pieces of linear rather than ring configuration, for convenience hereinafter called nuggets. Each nugget has a finite length and width and has a thickness equal to the thickness of an onion scale. A typical nugget might be for example, $1\frac{1}{4}$ inches long by $\frac{3}{4}$ inch wide by 1/16 inch thick, the latter dimension being a typical thickness for a single onion scale. By definition onion scales are the naturally occurring concentric shells of an onion bulb, seen as concentric rings when an onion is sliced. An individual scale has therefore a curved configuration in that its outer surface is convex and its inner surface is concave. Consequently, a nugget according to the invention has a convex surface and an opposite concave surface.

The nuggets of the invention have an attractive appearance as a food product. In addition, their size, shape and physical nature facilitate packaging, transportation and serving, and therefore they overcome a number of disadvantages which are associated with natural onion rings. For example, packaged natural onion rings are less dense than the onion nuggets of the present invention and, hence, the former take up more volume than the same weight of nuggets. Consequently, frozen transportation and storage costs are higher for rings than for nuggets. Also, natural onion rings are fragile and are subject to breakage during transportation, breakage sometimes being as high as 10% to 15%. Nuggets, on the other hand, are not fragile and can withstand a large amount of physical abuse during transportation, with little or no breakage. Further, the size of individual natural onion rings inherently varies over a wide range, thus making portion control very difficult when serving the product or when incorporating the product in a frozen dinner package. Onion nuggets, however, being smaller and of much more uniform size, pack well in serving containers, thus allowing for precise portion control. Still further, the slicing and dicing steps employed in making the onion nuggets can be controlled so as to make the nuggets in different sizes to meet customer specifications for different end uses.

In the interest of simplicity of expression, the term "dicing" is used herein to mean the cutting of an onion slab or slice into a plurality of pieces in a plurality of mutually perpendicular planes, without any significance as to the actual dimensions of the pieces. The term "batter" is used to include a liquid mixture applied to coat a nugget and a dry breading mixture applied subsequently and to include plural layers of each mixture.

Typically, and in broad terms, the process of the invention includes the following basic operations, beginning with raw onion bulbs:

(a) Feed the raw onion bulbs to a docker/peeler unit, which may be conventional, where the top, root and peel are removed and the bulbs washed with a water spray.

(b) Slice the onions transversely to form slabs exhibiting concentric rings of onion scales.

(c) Dice the slabs to form pieces. These pieces, as initially cut (except for those pieces cut from the peripheral portions of the slab), normally consist of finite lengths of several onion scales which are still adhered to each other as in the natural onion. Mechanical disturbance during cutting and during discharge of the pieces from the dicing machine will result in some separation of the scale portions, that is in the formation of some individual nuggets, but most of the pieces at this stage are multi-nugget pieces.

(d) Subject the freshly cut onion pieces to separating forces to ensure that each piece is separated into discrete nuggets. As described more in detail hereinafter it is preferred to employ a hydro-separation operation in conjunction with a subsequent mechanical separation operation because this combination is particularly effective.

(e) Orient the separated nuggets so that they are spaced apart from each other on a conveying surface which conveys them to a batter coating machine.

(f) Coat each discrete nugget with batter.

(g) Further process, as by partial frying or oil spraying without partial frying, freezing and packaging.

The dicing and separating operations, (c) and (d) above, are of particular importance in producing the final product in its desired form. The dicing operation may be performed by conventional machinery, preferably machinery which allows the spacing between dicing blades to be changed so that the size of the resulting pieces can be varied. Dicing is a necessary operation because it is a first step in forming the desired shape.

The separating operation (d) ensures that discrete small onion pieces, i.e. nuggets, not stuck together by natural onion juice or otherwise, are formed from the larger initially diced pieces, so that each discrete nugget can be batter-coated. The complete separation of each nugget from every other nugget, in a reasonable length of time and in a continuous manner, is critical to a successful commercial process. It is of course, possible to separate diced onion slabs into nuggets manually but this adds substantially to the cost. The combination of hydro forces followed by mechanical forces which cause the onion pieces to bounce has been found to effect the required separation at an acceptable rate.

The orienting operation, step (e), is also of great importance because it ensures that the individual onion nuggets are transferred uniformly to the batter-coating operation without reagglomeration, so that each nugget becomes individually coated with batter. It has been found that a specially developed vibratory conveyor in the form of a longitudinally grooved nonstick surface, arranged horizontally or nearly so and vibrated in a horizontal plane, is particularly suitable for this purpose. In the preferred process the width of each groove is slightly less than the width of an onion nugget, i.e. slightly less than the thickness of the slab from which the nugget was formed. With this configuration horizontal vibration of the surface in a direction parallel to the grooves causes the nuggets to align themselves along the upper edges of the grooves, with their long dimension parallel to the grooves and with their concave surfaces facing either up or down. In either case, the nuggets are transported uniformly along the lengths of the grooves and are individually discharged to the batter-coating machine or to a conveyor belt leading to the batter-coating machine.

Basically a vibratory conveyor is a spring-supported horizontal or slightly inclined elongated pan or tray which is vibrated in a horizontal plane, with the result that objects on the pan are propelled along the pan. Vibration can be imparted to the pan by a variety of devices including a direct-connected eccentric arm, rotating eccentric weights, an electromagnet or pneumatic or hydraulic cylinder. In one known form of vibratory conveyor, the pan is mounted by flexible tie rods to a stationary frame and a rotating eccentric-weight type of vibrator is attached directly to the pan. Conveyors of this general type are often used as vegetable graders, fruit orientation units and dewatering units.

The present invention makes use of any form of vibrating conveyor, provided that the special grooved, low-friction vibrating surface is used. Modification of an existing conveyor can usually be achieved by providing the special surface in the form of a grooved plate-like insert which can be attached to the upper surface of the pan.

BRIEF DESCRIPTION OF THE DRAWINGS

FIG. 1 is a schematic perspective view of a slab of an onion bulb;

FIG. 2 is a schematic plan view of the onion slab of FIG. 1;

FIG. 3 is a schematic view of an onion nugget;

FIG. 4 is a flow sheet illustrating the processing of onion bulbs into onion nuggets;

FIG. 5 is a schematic elevation of a special vibratory conveyor for orienting the onion nuggets and feeding them to a batter-coating operation; and FIG. 6 is a schematic section on the line 6—6 of FIG. 5.

DETAILED DESCRIPTION

FIGS. 1 and 2 illustrate an onion slab 10 and the manner of cutting or dicing it so that the pieces can be separated into the onion nuggets of the invention. Before dicing or cutting the slab 10 has the configuration shown in FIG. 1, wherein the onion scales 12 appear as concentric rings held together by the natural formation of the onion. FIG. 2 shows the mutually perpendicular planes 14 and 16 along which the slab 10 is cut into pieces in a dicing machine. It is preferred that the length of each piece substantially exceed its width and that the width exceed the natural width of an onion scale. The thickness of the pieces, i.e. the thickness of the slab 10 should also exceed the natural width of an onion scale. The length may be, for example, in the range $\frac{5}{8}$ inch to $2\frac{1}{2}$ inches and the width may be, for example, in the range 3/16 inch to $1\frac{1}{4}$ inches. The slab thickness may be, for example, in the range $\frac{1}{2}$ inch to $\frac{7}{8}$ inch. A preferred size is length $1\frac{1}{4}$ inch, width $\frac{3}{4}$ inch.

As in apparent from FIG. 2, most of the onion pieces consist of two or more finite lengths of onion scale 12. The pieces cut from the center and from the periphery of the slab 10 may contain odd-sized portions of the scales 12. The dicing operation, which usually includes a water spray and/or gravity discharge feature, will cause some separation of scales from each other, but considerably more separation must be effected in order to convert the diced pieces to discrete unagglomerated scale lengths or nuggets 18 as contemplated by the present invention.

A single onion nugget 18 is illustrated in FIG. 3. Its length is the length of the diced piece of FIG. 2 from which it was derived. Its width (the vertical dimension in FIG. 3) is the width of the slab 10 from which it was derived, and its width is the natural width of the onion scale.

FIG. 4 illustrates in flow-sheet form the steps of converting raw onion bulbs to packed, frozen onion nuggets.

The raw onion bulbs first enter a docker/peeler unit, which may be conventional, where the top, root and peel are removed. The bulbs are also washed with a water spray. The peeled bulbs then pass to a slicing machine which can be adjusted to slice the bulbs into slabs 10 (FIGS. 1 and 2) up to, for example, $\frac{7}{8}$ inch thickness. Next the slabs are fed to a dicing machine where they are cut into pieces, as illustrated in FIG. 2.

The onion pieces from the dicing machine are inherently sticky and in order to form the nuggets 18 of FIG. 3 in an efficient and economical manner they must be subjected to machine-generated separating forces. The first separation stage is performed by a hydroseparator which may be essentially conventional per se. The principal feature of a hydroseparator is a water flume into which the onion pieces are conveyed. As the pieces are carried through the separator by the flume they are water-soaked to loosen the scales from each other and then subjected to violent water turbulence generated by water jets aimed downwardly into the flume. A dewatering conveyor is located at the end of the separator to remove the pieces and nuggets from the water and dump them on a conveyor belt. The water, which is recycled to the flume, can be varied in temperature from room temperature to about 135° F. Higher temperatures tend to damage the onion pieces.

Further separation of the onion pieces into nuggets takes place on a mechanical separator in the form of a conveyor belt which is bounced vertically at high frequency by beaters located under the belt. The magnitude of the bounce is such that the onion pieces strike a lid, some 4 to 5 inches above the belt. Residence time in the mechanical separator is normally in the range 20 seconds to 1 minute.

Next the nuggets pass to a vibrating horizontal tray or screening unit which is perforated with holes up to, for example, ¾ inch and an open area of about 50%. This removes unwanted small particles.

Next the nuggets pass to a manual inspection conveyor where any roots, cores, peel or unseparated excessive-sized pieces are removed.

Next the nuggets pass to a special nugget orientation unit which ensures that discrete unagglomerated nuggets are conveyed to the batter-coating operation. The orientation unit, illustrated schematically in FIGS. 5 and 6, includes a special longitudinally grooved low-friction, non-stick surface 20, preferably formed of ultrahigh molecular weight polyethylene. The surface 20 may be an insert made to fit the tray 22 of an existing vibrating conveyor. As illustrated in FIG. 5 the tray is spring-mounted by tie rods 24 to a stationary frame. A rotating eccentric-weight vibrating device 26 is secured to the back end of the tray 22 where the nuggets enter. The vibratory motion in a horizontal plane and in the direction of the grooves 28 may have a stroke of ⅛ to ¼ inch and a frequency of about 1000 cycles per minute.

Each groove 28 has a maximum width at its top which is less than the width of a nugget 18, and the tops of the lands are configured to reduce the frictional area of contact between them and the nuggets 18. A preferred groove-and-land configuration is saw-toothed in transverse cross-section as illustrated in FIG. 6. In the illustrated arrangement the tops of the lands are quite sharp and the grooves 28 are ¼ inch center-to-center. Reduced contact between lands and nuggets 18 can also be achieved with rounded land tops or thin lands, but in general a saw-toothed configuration is preferred. Groove depth may be, for example, ¼ inch and groove length may be 5½ feet. Vibratory motion of the tray 22 causes an efficient spreading of the nuggets laterally and longitudinally as they are conveyed toward the discharge end of the tray 22.

At the discharge end the nuggets 18 slide onto a conveyor belt which transports them to a batter-coating system. The latter may be conventional and may include a downwardly directed curtain of batter through which the nuggets are passed. The entire surface of each nugget, including each end surface, becomes coated.

One of the principal features of the orientation unit is to prevent overlap of the nuggets so that only discrete unagglomerated nuggets are subsequently coated with batter. The batter-coated product will not be satisfactory if masses or clumps of nuggets 18 are fed to the coating machine, because the coated clumps will render the product non-uniform. In addition, the clumps will be subject to breakage during transport. It has been found that the special low-friction grooved surface 20 accomplishes this result rapidly and effectively so that a high production rate in a continuous nugget-manufacturing process can be maintained. The relatively narrow width of the grooves 28 assures that the nuggets 18 ride on top of the lands, and the contour and/or width of the latter assures that there is little friction between the lands and the nuggets. As a result the nuggets 18 move away from each other simultaneously with movement in the transport direction, and this overcomes the agglomeration problem which is experienced if a conventional vibratory conveyor is used. Most of the nuggets 18 tend to align themselves parallel with the grooves 28, but this alignment is not critical; what is important is the efficient spreading of the nuggets 18 one from the other.

The batter-coating and further process steps may be carried out with equipment which is conventional in onion-ring production. For example, the coated nuggets can be par-fried at 350° to 390° F. for 25–30 seconds and then quick-frozen. Alternatively, the coated nuggets can be sprayed with vegetable oil to prevent sticking and then frozen.

What is claimed is:

1. A process for producing an onion food product comprising: slicing onion bulbs transversely to form slabs exhibiting concentric rings of onion scales; cutting each slab into pieces having a thickness dimension equal to the thickness of the slab, a width dimension and a length dimension greater than the width dimension by cutting along planes which are perpendicular to the plane of the slab and which are perpendicular to each other, the width and length dimensions being such that most of the pieces include a plurality of curved lengths of onion scales in side-by-side relationship; separating the onion pieces into their individual scales thereby forming nuggets; feeding the onion nuggets onto the upper surface of a generally horizontal elongated surface provided with longitudinal grooves, the surface being constructed of low-friction non-stick material and the surface being vibrated horizontally in the directions of the grooves to convey the nuggets longitudinally of the grooves and simultaneously to cause the nuggets to spread out laterally and longitudinally of the grooves so as to form discrete unagglomerated nuggets; discharging the discrete, unagglomerated nuggets to a batter-coating operation whereby the entire surface of each nugget becomes coated with batter.

2. A process as in claim 1 wherein the grooves and the lands between them have widths less than the width of the nuggets.

3. A process as in claim 2 wherein the grooves and lands are saw-toothed in transverse cross-section.

* * * * *